United States Patent [19]

Schnellmann

[11] Patent Number: 4,545,234
[45] Date of Patent: Oct. 8, 1985

[54] LEVER-ACTUATED TONGS

[75] Inventor: Klaus Schnellmann, Niederweningen, Switzerland

[73] Assignee: Stapex AG, Wohlen, Switzerland

[21] Appl. No.: 571,371

[22] Filed: Jan. 16, 1984

[30] Foreign Application Priority Data

Jan. 25, 1983 [CH] Switzerland ............................ 407/83

[51] Int. Cl.⁴ ............................................. B21D 7/06
[52] U.S. Cl. ........................................ 72/410; 81/416; 30/193
[58] Field of Search ............... 72/410, 409; 29/243.56, 29/751, 758, 270, 280; 30/192, 193; 7/157, 125, 127; 81/347-355, 342, 304, 308, 309, 300, 428, 416

[56] References Cited

U.S. PATENT DOCUMENTS

| 2,948,962 | 8/1960 | Manning | 81/416 |
| 3,182,485 | 5/1965 | Sund | 72/410 |
| 4,080,820 | 3/1978 | Allen | 29/758 |
| 4,275,584 | 6/1981 | Kruschel | 72/410 |

FOREIGN PATENT DOCUMENTS 177126 12/1953 Austria ................................ 81/348

Primary Examiner—Daniel C. Crane
Attorney, Agent, or Firm—Werner W. Kleeman

[57] ABSTRACT

A roller is mounted on a pivot pin connecting two operating handles. In operation, two further rolls or rollers mounted on two further pivot pins, each connecting a respective jaw lever to one of the operating handles, bear on this roller. The jaw levers pivot about fulcrum pins and are provided with closing jaws for closing a clamping seal used to join the ends of a packing ligature or band. The rollers relieve the pivots of load, so that the tongs containing the jaw levers are suited to the transmission of elevated forces.

10 Claims, 3 Drawing Figures

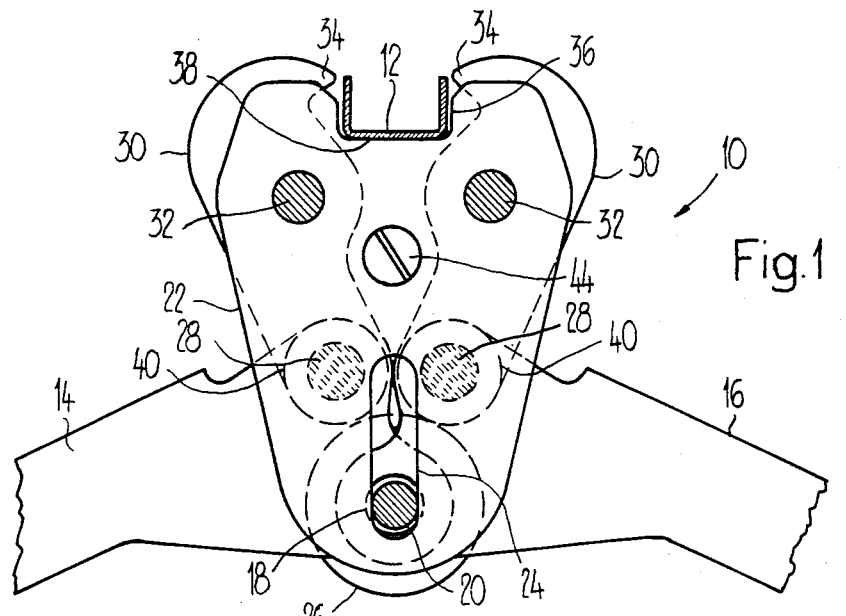
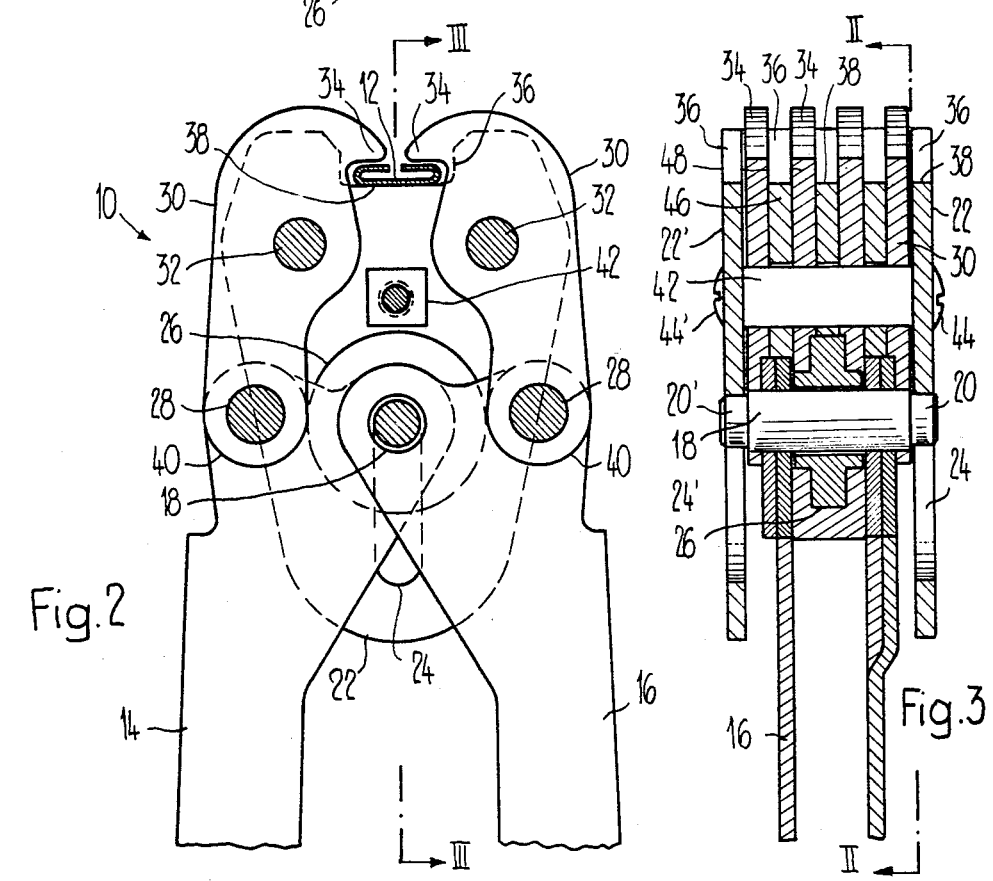

LEVER-ACTUATED TONGS

CROSS REFERENCE TO RELATED APPLICATION

This application is related to my commonly assigned, copending U.S. application Ser. No. 06/571,368, filed Jan. 16, 1984, entitled "Clamping Seal For Connecting The Ends Of A Packing Strap".

BACKGROUND OF THE INVENTION

The present invention broadly relates to a manual force-multiplying device and, more specifically, pertains to a new and improved construction of a lever-actuated tong device.

Generally speaking, the lever-actuated tong device of the present invention is of the type comprising two operating or actuating handles pivotable about a central pivot or pivot pin. Mounted at each operating handle, by means of a further pivot or pivot pin, is a respective jaw or pivotal lever. Both of the jaw levers are pivotably mounted in a fixed relation to one another about at least one pivot pin.

Such type of tong devices comprise moveable mutually closing jaws actuated by means providing a double-levered action. Such tongs are particularly employed as bolt-cutting pliers or as seal-clamping pliers in which the pivoting motion of the manually operated handles is relatively greatly multiplied in order to attain a relatively large closing force at the jaws.

To fulfill increased force requirements with a given size of tong head, it is not sufficient merely to lengthen the operating or actuating handles since the pivots would then be overloaded. It is also then necessary to reinforce the pivots. This means that the lever-actuated tong device tends to become larger and more inconvenient to handle.

SUMMARY OF THE INVENTION

Therefore, with the foregoing in mind it is a primary object of the present invention to provide a new and improved construction of a lever-actuated tong device which does not have associated with it the aforementioned drawbacks and shortcomings of the prior art constructions.

Another and more specific object of the present invention aims at providing a new and improved construction of a lever-actuated tong device of the previously mentioned type which is suited to transmit greater forces for a given size than heretofore known devices.

Yet a further significant object of the present invention aims at providing a new and improved construction of a lever-actuated tong device of the character described which is relatively simple in construction and design, extremely economical to manufacture, highly reliable in operation, not readily subject to breakdown or malfunction and requires a minimum of maintenance and service.

Now in order to implement these and still further objects of the invention, which will become more readily apparent as the description proceeds, the lever-actuated tong device of the present invention is manifested by the features that the central pivot pin, on the one hand, and both of the further pivot pins, on the other hand, are mutually supported upon rolls or rollers. With this solution the force applied by the operating handles to the jaw levers is transmitted by the rollers. In this manner the pivots acting as bell cranks are relieved of load which makes it possible to design a compact and efficient tong. It is also possible to strengthen an already existing design by incorporating rollers.

One advantageous embodiment of the invention provides a wedging force exerted by a roller mounted on the axis of the central pivot pin to force apart further rollers mounted on the axes of the further pivot pins. In particular, this embodiment transfers the forces from the pivot pins to the rollers.

A further embodiment of the invention contemplates that the roller of the central pivot pin has a larger diameter than that of both of the rollers of both further pivot pins. Such an arrangement is particularly advantageous when the fulcrum axes of the jaw levers are disposed in spaced relationship to one another at a minimum distance. The dimensioning of the geometry of the jaw lever is particularly dependent upon this distance.

Although it is possible to mount both jaw levers on one and the same axis, according to a further embodiment of the invention it is advantageous to provide each jaw lever with its own fulcrum axis in fixed spaced relationship to the fulcrum axis of the other.

A still further embodiment of the invention governs the fixed spacing of these axes and produces a particularly robust construction of the jaw head in which the center pivot pin is precisely guided in relation to the fulcrum axes of the jaw levers by a guide slot. The guide slot further permits the provision of a stop to prevent the motion of the jaw levers beyond a prescribed amount.

This restriction of motion by the guide slot is particularly advantageous when the lever-actuated tong device is structured to close a clamping seal. The stop in the guide slot allows the closing jaws to approach one another to within a predetermined dimension and no further.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 schematically illustrates part of the inventive lever-actuated tong device including its tong head in the open position;

FIG. 2 is a partial view of the tong head in the closed position substantially taken at the position indicated by the line II—II of FIG. 3; and FIG. 3 is a cross-section of the tong head substantially taken along line III—III of FIG. 2.

DETAILED DESCRIPTION OF THE PREFERRED EMBODIMENTS

Describing now the drawings, it is to be understood that to simplify the showing of the drawings only enough of the structure of the exemplary embodiment of lever-actuated tong device has been illustrated therein as is needed to enable one skilled in the art to readily understand the underlying principles and concepts of this invention. The illustrated exemplary embodiment of tong device will be seen to comprise a closing head 10 for closing a metallic seal 12 on a packing band or ligature not shown in the drawings which is employed to secure or tie packages or bundled objects. Seal 12 is only shown in end view in FIGS. 1 and 2 but normally has a length corresponding to the thickness of the closing or closure head 10 shown in FIG. 3.

Operating levers or handles 14 and 16 of the tong device are shown greatly shortened in FIG. 1. They are connected to one another by a central pivot formed by a pivot pin 18. Pivot pin 18 is provided with pivot journals 20, 20' at each end (FIG. 3) which are radially guided in guideways or slots 24, 24' in outer or cover plates 22, 22'. Guideways or slots 24, 24' extend substantially along the line of symmetry of the tong device 10. A large diameter roller 26 is rotatably mounted on the pivot pin 18 between the outer or cover plates 22, 22'.

Clamping or jaw levers 30 are pivoted to each operating lever or handle 14, 16 by means of further pivot pins 28. These clamping or jaw levers 30 are pivoted on fulcrum or bearing pins 32. Fulcrum pins 32 are disposed in fixed spaced relationship to one another in symmetrical relationship to the line of symmetry of the outer or cover plates 22, 22'. The outer or free ends of each jaw lever 30 are structured as symmetrical closing jaws 34 for closing clamping seal 12.

Cover plates 22, 22' are each provided with a substantially rectangular notch or recess 36 for accommodating the clamping seal 12. The bottom surface 38 of each such notch or recess 36 serves as the opposing anvil or counter support for the closing jaws 34 in the closed position. Although the flaps or legs of the closed seal 12 illustrated in FIG. 2 do not overlap, the tong device shown is also suited for closing seals of mutually overlapping flaps or legs.

Further rollers or rolls 40 are mounted on each pivot pin 28. Both rollers 40 have a smaller diameter than the large diameter roller 26 mounted on the central pivot pin 18. Their peripheral surfaces are in rolling contact with the peripheral surface of the large diameter roller 26. By this means, the pivots between the operating levers or handles 14, 16 acting in the manner of bell cranks and the clamping or jaw levers 30 are relieved of load. In other words, the transmitted force can be increased, since the rollers or rolls 26 and 40 essentially transmit the forces. When manually operating the operating or actuating handles 14, 16, the smaller diameter rollers 40 are forced apart by a wedging action of the large diameter roller 26. It will be understood that it is prerequisite that the sum of the radii of the large diameter roller 26 and either of the smaller diameter rollers 40 exactly correspond to the length of the lever arm between the pivot pin 18 and the corresponding pivot pin 28.

It can be seen from FIG. 3 that the two outer or cover plates 22 and 22' are connected in fixed spaced relationship to one another by a four-cornered or square strut or brace 42. Strut or brace 42 is fastened to both outer or cover plates 22 and 22' by oval head screws 44 and 44' or equivalent structure.

It can be further seen from FIG. 3 that three intermediate plates 46 are disposed between the outer or cover plates 22 and 22'. Intermediate plates 46 are also provided with the same substantially rectangular notches or recesses 36 as are the outer or cover plates 22, 22'. Therefore the clamping seals 12 to be closed are supported not only by the notches or recesses 36 in plates 22 and 22' but also by the bottom anvil surfaces 38 of the corresponding notches or recesses 36 in the three intermediate plates 46. Intermediate plates 46 are not shown in FIGS. 1 and 2 in order not to complicate the drawings. These intermediate plates 46 bear with one edge on the four-cornered or square strut or brace 42 and are held in position by pivot pins 32.

Further clamping or jaw levers 48 are disposed between pairs of intermediate plates 46 and are operated in parallel with the clamping or jaw levers 30. These supplementary or auxiliary clamping or jaw levers 48 are also provided with closing jaws 34. The clamping seals 12 to be closed are therefore engaged by four closing jaw pairs 34 and simultaneously supported by five bottom anvil surfaces 38 of notches 36. Closing jaws 34 symmetrically engage the flaps or legs of a clamping seal 12 in order to bend them toward the web or intermediate section of the seal. This process clampingly connects both ends of a suitable packing band or ligature not shown in the drawings. The alternating arrangement of closing jaw pairs 30 and anvil surfaces 38 assures that the clamping seals 12 are uniformly closed over their entire length.

Although clamping pliers for closing seals have been described as an exemplary embodiment, the same principle of the lever-actuated tong device can be applied to bolt cutters and other similar tools requiring the transmission of a large force to their jaws.

A design is also conceivable in which only the two further pivots are provided with rollers while the central pivot is connected to a wedge which drives the rollers of the two further pivots apart when the operating levers or handles are pushed together.

While there are shown and described present preferred embodiments of the invention, it is to be distinctly understood that the invention is not limited thereto, but may be otherwise variously embodied and practiced within the scope of the following claims. Accordingly,

What I claim is:

1. A lever-actuated tong device, comprising:
   two pivotable operating handles;
   means defining a substantially central pivot axis about which there are pivotably mounted said at least two pivotable operating handles;
   two jaw levers cooperating with said two pivotable operating handles;
   a respective pivot means for pivotably mounting a respective one of said jaw levers at a related one of said operating handles;
   means defining at least one fuclrum axis about which there are pivotably mounted both of said jaw levers in a substantially fixed relationship to one another;
   rollers at which there are supported said central pivot axis and said respective pivot means;
   one of said rollers defining a central roller which is mounted on said means defining a substantially central pivot axis;
   two other ones of said rollers being mounted upon said respective pivot means; and
   said rollers mounted upon said respective pivot means rolling upon said central roller.

2. The lever-actuated tong device according to claim 1, wherein:
   the central roller has a greater diameter than said two other ones of said rollers mounted upon said respective pivot means.

3. The lever-actuated tong device according to claim 1, wherein:
   said means defining at least one fulcrum axis comprises means providing two fulcrum axes at which both of said jaw levers are pivotably mounted at a substantially fixed spacing from one another.

4. The lever-actuated tong device according to claim 3, further comprising:
at least two substantially mutually parallel outer plates;
longitudinal guideways provided in said outer plates;
said jaw levers being mounted between said parallel outer plates;
said parallel outer plates providing bearing means for the fulcrum axes of the jaw levers;
said means defining said central pivot axis comprising a pivot pin guided in said guideways of said outer plates; and
said guideways of said outer plates extending along a central line which is disposed substantially symmetrically with respect to both of said fulcrum axes.

5. The lever-actuated tong device according to claim 4, wherein:
said longitudinal guideways comprise a respective elongated guide slot provided in each outer plate.

6. The lever-actuated tong device according to claim 1, wherein:
each of said jaw levers comprising a jaw member; and
said jaw members being mounted at said means defining at least one fulcrum axis so as to be mutually movable towards one another and serving as closure jaws for closing a clamping seal.

7. A lever-actuated tong device, comprising:
two pivotable operating handles;
means defining a substantially central pivot axis about which there are pivotably mounted said at least two pivotable operating handles;
two jaw levers cooperating with said two pivotable operating handles;
a respective pivot means for pivotably mounting a respective one of said jaw levers at a related one of said operating handles;
means defining at least one fulcrum axis about which there are pivotably mounted both of said jaw levers in a substantially fixed relationship to one another;
first support means mounted on said means defining a substantially central pivot axis;
second support means mounted upon each of said respective pivot means; and
said second support means being supported by said first support means throughout the entire pivotal operation of said two pivotable operating handles.

8. The lever-actuated tong device according to claim 7, wherein:
said first support means is a first roller defining a central roller; and
each of said second support means is a second roller.

9. The lever-actuated tong device according to claim 8, wherein:
said second rollers roll upon said central roller during pivotal operation of said two pivotable operating handles.

10. The lever-actuated tong device according to claim 8, wherein:
the central roller has a greater diameter than said two other ones of said rollers mounted upon said respective pivot means.

* * * * *

UNITED STATES PATENT AND TRADEMARK OFFICE
CERTIFICATE OF CORRECTION

PATENT NO. : 4,545,234

DATED : October 8, 1985

INVENTOR(S) : KLAUS SCHNELLMANN

It is certified that error appears in the above—identified patent and that said Letters Patent is hereby corrected as shown below:

Column 4, line 2 of claim 3, please change "1" to read --7--

*Signed and Sealed this*

*Fourteenth* Day of *January 1986*

[SEAL]

*Attest:*

DONALD J. QUIGG

*Attesting Officer*

*Commissioner of Patents and Trademarks*